Feb. 26, 1957 L. B. PROUT 2,783,089
WINDING REEL FOR OXY-ACETYLENE TORCH HOSES
Filed April 10, 1953 2 Sheets-Sheet 1
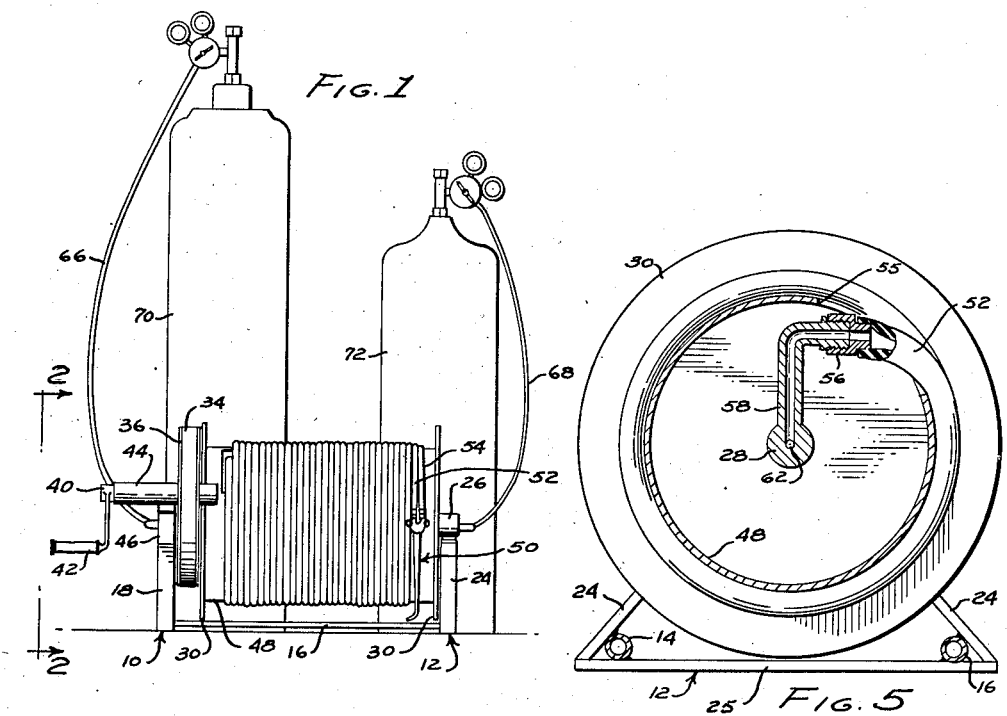
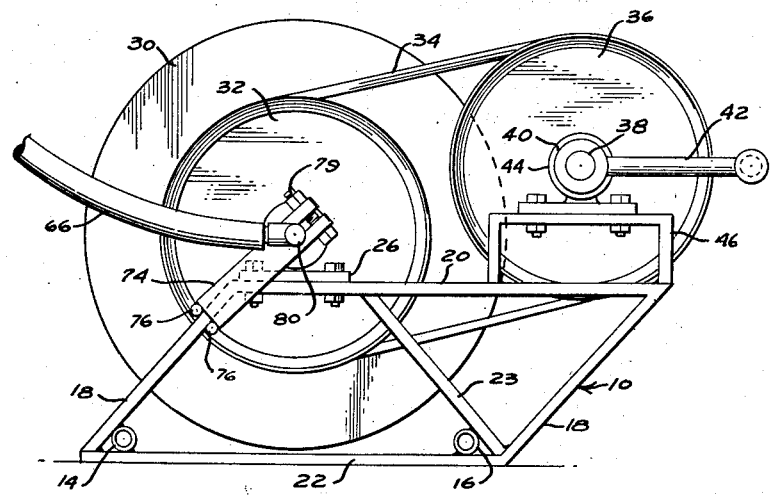
INVENTOR.
LESTER B. PROUT
BY
McMorrow, Berman + Davidson
ATTORNEYS Feb. 26, 1957 L. B. PROUT 2,783,089
WINDING REEL FOR OXY-ACETYLENE TORCH HOSES
Filed April 10, 1953 2 Sheets-Sheet 2
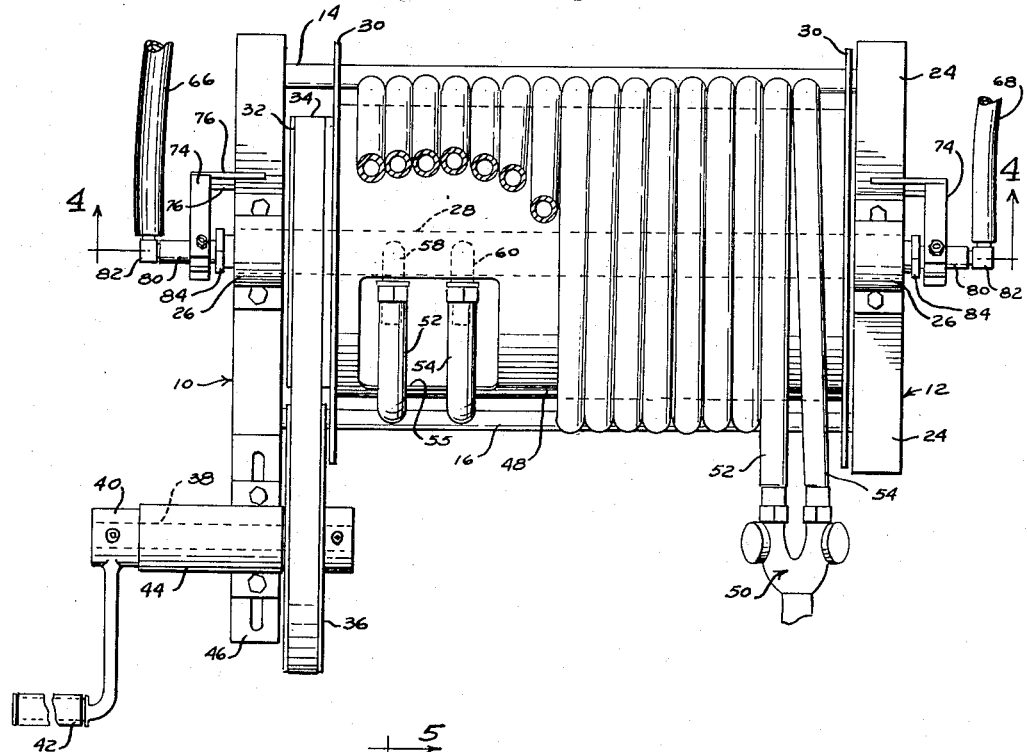
INVENTOR.
LESTER B. PROUT
BY
McMorrow, Berman & Davidson
ATTORNEYS

United States Patent Office 2,783,089
Patented Feb. 26, 1957

2,783,089

WINDING REEL FOR OXY-ACETYLENE TORCH HOSES

Lester B. Prout, Lenora, Kans.

Application April 10, 1953, Serial No. 347,948

1 Claim. (Cl. 299—78)

This invention relates to a reel about which may be coiled the two hoses used for supplying oxygen and acetylene, respectively, to a welding and cutting torch of the oxy-acetylene type.

Summarized briefly, the invention comprises a revoluble reel so designed as to permit a pair of hoses extending to a torch to be readily coiled thereupon. In accordance with the invention, the reel includes a drum on which the hoses are wound. A shaft is rotatable with the drum and has its opposite ends projecting beyond the heads of the drum to define trunnions journaled in suitable bearings carried by an associated frame work. The shaft is formed with separate, longitudinally disposed passages for oxygen and acetylene, respectively, said passages extending inwardly from the opposite ends of the shaft and having their inner ends terminating in closely spaced relation between said shaft ends. Tubular arms, in communication with said inner ends of the passages, are adapted for connection of the inner ends of the hoses thereto, thus to communicate the passages with the hoses leading to the torch. In the outer ends of the shaft, counter bores are formed, receiving tubular members that are held stationary while the shaft rotates, said tubular members being adapted at their outer ends to be connected in communication with supplies of oxygen and acetylene, respectively, maintained under pressure. To hold the tubular members against rotation while the drum is revolving, blocks are clampably engaged with said tubular members, said blocks having laterally projecting pins engaged by the supporting frame of the structure. Completing the structure is a means for rotating the drum, said means including a belt and pulley device adapted for manual operation.

The advantages of a reel of the character briefly described above can be readily appreciated, when there is called to mind the hazardous conditions created by the extension of tangled hoses over the floor of an enclosure in which work is being performed with a welding and cutting torch. Most usually, the hoses are extended in a haphazard manner over the floor surface, and when the worker moves to different locations within said enclosure, the hoses become entangled, thus to tend not only toward causing personal injury, but also fire and damage caused by the overturning of machines or the like.

The main object of the present invention is to provide an improved winding reel for the hoses of an oxy-acetylene torch, which will permit the hoses to be coiled neatly about a rotating drum, in a manner whereby said hoses can be unwound to any extent desired, and rewound upon the drum with equal facility.

Another object of importance is to provide a reel of the type stated which will be particularly designed to facilitate the supplying of different gases, such as oxygen and acetylene, to individual hoses coiled upon the reel, while at the same time permitting the drum portion of the reel to be rotated freely in either direction.

Another object of importance is to provide a structure as described which, though efficiently adapted to discharge the functions discussed above, will yet be rugged, simply designed, and capable of manufacture at relatively low cost.

Other objects will appear from the following description, the claim appended thereto, and from the annexed drawings, in which like reference characters designate like parts throughout the several views, and wherein:

Figure 1 is a front elevational view of a hose reel formed in accordance with the present invention, as it appears when associated with conventionally designed oxygen and acetylene tanks;

Figure 2 is an enlarged side elevational view, wherein the reel is seen from the line 2—2 of Figure 1;

Figure 3 is an enlarged top plan view of the reel in which portions have been broken away;

Figure 4 is a longtiudinal sectional view taken substantially on line 4—4 of Figure 3; and Figure 5 is a transverse sectional view on line 5—5 of Figure 4.

The reference numeral 10 has been applied in the drawings to designate, generally, one of a pair of frame works, the frame work 10 being disposed at one side of the structure constituting the present invention. The reference numeral 12 has been applied generally to the frame work at the other side of the structure.

The two frame works are fixedly connected, in spaced relation, by cross bars 14, 16 respectively, said cross bars being each welded at its opposite ends to the respective frame works. As a result, a rigid support frame of open design is provided, upon which the rotary drum, to be described hereinafter, is journaled.

The frame works 10, 12 differ from one another in respect to the particular constructional details thereof, and accordingly, each will be described in turn. Considering first the construction of the frame work 10, reference is had to Figure 2, wherein it is shown that the frame work 10 is formed in the shape of a parallelogram, with inclined rear and front legs 18 integral or otherwise rigidly connected, at their upper ends, to a horizontally disposed top frame member 20. A bottom frame member is designated by the reference numeral 22, and is supported upon a suitable floor surface, to which it can be bolted if desired.

For the purpose of bracing the parallelogram frame work 10, an inclined brace member 23 is provided, said brace member being welded or otherwise fixedly connected at its opposite ends to the top and bottom frame members 20, 22 respectively.

The frame work 12 is formed approximately in the shape of an isosceles triangle, having downwardly diverging legs 24 fixedly connected at their lower ends to a bottom frame member 25. At their upper ends, the legs 24 are fixedly connected to the opposite ends of a relatively short, horizontally disposed top frame portion.

Mounted upon the top portions of the respective frame works are bearings 26, and journaled at its opposite ends in the respective bearings is a relatively elongated, horizontally disposed drum shaft 28.

Spaced inwardly from the opposite ends of the shaft 28 are circular drum heads 30 having center openings receiving the shaft 28, the shaft being welded to said heads 30.

As best shown in Figure 4, I weld to the outer surface of one drum head 30 a large driven pulley 32 about which is trained a belt 34, that also passes about a smaller drive pulley 36 (Figure 2), keyed to or otherwise made rotatable with a stub shaft 38 having secured thereto the hub 40 of a hand crank 42. Shaft 38 is journaled in a bearing 44 adjustably mounted upon an extension frame work 46 rigidly supported upon and projecting upwardly above the top frame member 20.

Fixedly secured at its opposite ends to the inner surfaces of the drum heads 30 is a hollow cylinder 48 concentric with shaft 28 and formed to a diameter substantially less than that of heads 30.

A conventional oxy-acetylene welding and cutting torch has been designated generally by the reference numeral 50, and is connected to the outer ends of a pair of hoses 52, 54. As will be understood, oxygen is supplied through one of said hoses, with acetylene being supplied through the other hose.

The hoses 52, 54 are coiled about the cylinder 48 in side by side relation, said hoses being wound spirally upon the drum cylinder and having their inner ends extending through a large opening 55 formed in the cylinder adjacent one end thereof. Inwardly of said opening 55, the inner ends of the hoses are connected by fittings 56 to the laterally projected outer ends of tubular arms 58, 60. Arms 58, 60 are disposed in closely spaced relation, said arms being spaced longitudinally of the shaft 28 and being rigid at their inner ends with said shaft. The tubular arms project radially from the shaft, and thus, when the drum is rotated, the arms, cylinder, and drum shaft will all rotate as a single unit.

At their inner ends, the arms 58, 60 are in communication with the closely spaced inner ends of longitudinal passages 62, 64 of shaft 28. Referring to Figure 4, the passage 62 would be used for supplying acetylene to the acetylene hose 52, through the tubular arm 58. Passage 64 would be used for supplying oxygen to the oxygen hose 54, through the tubular arm 60.

For the purpose of supplying acetylene to passage 62, a supply hose 66 extends from an acetylene tank, a supply hose 68 being extended from an oxygen tank. The acetylene tank has been designated by the reference numeral 70, while the oxygen tank has been designated 72.

The means whereby the supply hoses 66, 68 are connected in continuous communication with the passages 62, 64, even during rotation of the drum, is shown to particular advantage in Figures 2 and 4, and includes, adjacent each frame work, a holding block 74 having at one end laterally projected, spaced pins 76 engaging opposite sides of an adjacent leg of a frame work. The pins 76, of course, are fixedly secured to their associated block 74.

In the other end of each block 74, there is formed a longitudinal slot terminating at its inner end in an opening 78, a clamping bolt 79 extending transversely of the block 74, between the opposite walls of the slot, for the purpose of clampably engaging, in the opening 78, the projecting outer end portion of a tubular member 80.

The construction of each tubular member 80 is shown to its best advantage in Figure 4, and as will be noted, at its outer end, each tubular member 80 is provided with a threaded counterbore, in which is engaged a connecting fitting 82, said fitting 82 being detachably connected to the outlet end of the supply hose 66 or 68, as the case may be. The tubular member 80 at each end of shaft 28 is extended, intermediate its ends, through a packing nut 84, engaged in the threaded outer end of a counterbore formed in the adjacent end portion of the shaft 28.

The inner end of each tubular member 80 extends into said counterbore, and surrounding said inner end of the tubular member is packing 86, held in place by the gland or packing nut 84. The packing 86 abuts, at its inner end, against an inner packing ring 88, which in turn abuts against a circumferential collar 90 formed upon the tubular member 80 at the inner end thereof. Interiorly of the collar 90, an inner thrust ring 92 is seated in the counterbore.

It should be noted at this point that the packing assemblies must be free of hydrocarbon grease or oil, it being essential that the packing material be inert to compressed oxygen.

In use of the device, the oxygen and acetylene will be supplied to the passages 62, 64, whether the drum is rotating or is stationary. The block 74, of course, will prevent rotatable movement of the tubular member 80, said tubular members remaining stationary while the shaft 28 rotates in either direction.

In this way, fuel is supplied to the torch 50 at all times while said torch is in actual use, and the worker will, of course, be free to manipulate the torch and move from place to place therewith, unwinding the drum to any extent desired during the flow of the gases from the tanks.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A hose reel comprising: a stationary frame; a drum including a shaft journalled upon the frame and having a longitudinal passage formed at one end with a counterbore opening upon the same end of the shaft and threaded for part of its length; means on the shaft at the other end of the passage for connecting in fluid communication with said other end of the passage a hose wound upon the drum; a tubular member extending into said counterbore and communicating with said passage, said member having an outer end projecting out of the counterbore for connection to a source of a fluid material to be directed through said tubular member and passage to the hose, the tubular member at its inner end being formed with a circumferential collar slidably engaged with the wall of the counterbore; a packing nut surrounding the tubular member and threaded into the counterbore; packing surrounding the tubular member within the counterbore and interposed between the packing nut and collar, said tubular member on loosening of the nut and packing being free to slide axially within the counterbore in a direction outwardly of the counterbore, said packing nut when threaded inwardly of the counterbore compressing the packing between the nut and collar and said packing and packing nut constituting the sole means holding the tubular member against movement in an axial direction outwardly of the counterbore; and means for holding the tubular member against rotation with said shaft, comprising a block connected fixedly to said tubular member and extending radially from said tubular member and laterally spaced pins rigid with the outer end of the block and extending parallel to the tubular member, said pins extending at opposite sides of a portion of said frame whereby to be engaged by said portion of the frame against movement through a circular path about the axis of the tubular member, thus to hold the tubular member against rotation with the shaft, said pin being freely slidable upon said portion of the frame, whereby said means will be free to move with the tubular member in an axial direction.

References Cited in the file of this patent

UNITED STATES PATENTS

| | | |
|---|---|---|
| 1,280,574 | Steed | Oct. 1, 1918 |
| 2,071,174 | Parker | Feb. 16, 1937 |
| 2,221,566 | Barks | Nov. 12, 1940 |
| 2,629,630 | Roark | Feb. 24, 1953 |